United States Patent
Shibata et al.

(10) Patent No.: US 9,148,904 B2
(45) Date of Patent: Sep. 29, 2015

(54) COMMUNICATION APPARATUS

(71) Applicants: Takeshi Shibata, Nagoya (JP); Takeshi Nagasaki, Nagoya (JP)

(72) Inventors: Takeshi Shibata, Nagoya (JP); Takeshi Nagasaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 200 days.

(21) Appl. No.: 14/039,100

(22) Filed: Sep. 27, 2013

(65) Prior Publication Data

US 2014/0092776 A1    Apr. 3, 2014

(30) Foreign Application Priority Data

Sep. 28, 2012 (JP) ................................. 2012-218124

(51) Int. Cl.
| | |
|---|---|
| H04W 84/18 | (2009.01) |
| H04W 4/00 | (2009.01) |
| G06F 15/177 | (2006.01) |
| H04L 29/08 | (2006.01) |
| H04W 48/20 | (2009.01) |
| H04W 84/12 | (2009.01) |

(52) U.S. Cl.
CPC ......... *H04W 84/18* (2013.01); *H04L 29/08648* (2013.01); *H04W 48/20* (2013.01); *H04W 84/12* (2013.01)

(58) Field of Classification Search
CPC .................. H04L 29/08333; H04L 29/08306; H04L 67/104; H04L 67/1042; H04L 67/1046; H04L 67/1053
See application file for complete search history.

(56) References Cited

U.S. PATENT DOCUMENTS

| | | | |
|---|---|---|---|
| 8,948,144 B1* | 2/2015 | Issa et al. | 370/338 |
| 2006/0168318 A1* | 7/2006 | Twiss | 709/238 |
| 2009/0092060 A1* | 4/2009 | Goto | 370/254 |
| 2010/0135331 A1* | 6/2010 | Bauchot et al. | 370/503 |
| 2011/0249631 A1* | 10/2011 | Li et al. | 370/329 |

FOREIGN PATENT DOCUMENTS

| | | | |
|---|---|---|---|
| JP | 2002185458 A | 6/2002 | |
| JP | 2008277919 A | 11/2008 | |

OTHER PUBLICATIONS

Wi-Fi Alliance Technical Committee P2P Task Group, "Wi-Fi Peer-to-Peer (P2P) Technical Specification," Version 1.1, pp. 1-159.

* cited by examiner

*Primary Examiner* — Dang Ton
*Assistant Examiner* — Ryan Kavleski
(74) *Attorney, Agent, or Firm* — Banner & Witcoff, Ltd.

(57) ABSTRACT

A communication apparatus includes: a processor to execute determining whether the number of slave stations belonging to a first wireless network as a slave station is the same as a upper limit; transmitting first wireless setting information, when it is determined as a first case that the number of the slave station apparatuses is smaller than the upper limit; transmitting, when it is determined a second case that the number of the slave station apparatuses is the same as the upper limit, second wireless setting information; and performing, in the first case, communication of target data by using the first wireless network, and performing, in the second case, communication of the target data by using the second wireless network.

11 Claims, 7 Drawing Sheets

COMMUNICATION APPARATUS

CROSS-REFERENCE TO RELATED APPLICATION

This application claims priority from Japanese Patent Application No. 2012-218124 filed on Sep. 28, 2012, the entire subject matter of which is incorporated herein by reference.

TECHNICAL FIELD

This disclosure discloses a communication apparatus capable of belonging to a wireless network.

BACKGROUND

There is a technology relating to wireless communication based on a WFD (Wi-Fi Direct) mode. In the WFD mode, a pair of wireless communication apparatuses performs wireless communication referred to as G/O (Group Owner) negotiation when establishing a new wireless network. Thereby, it is determined that one wireless communication apparatus operates as a G/O device of the wireless network and the other wireless communication apparatus operates as a client device of the wireless network.

SUMMARY

This disclosure discloses a technology enabling a communication apparatus, which belongs to a wireless network as a master station, to appropriately perform communication of target data with a target device.

A communication apparatus of this disclosure comprises: a specific interface; a processor; and memory. The memory stores instructions that, when executed by the processor, causes the processor to execute receiving a participation request from a target device through the specific interface, in a state where a first wireless network to which the communication apparatus belongs as a master station has been established, for requesting participation in the first wireless network, the target device not belonging to the first wireless network; determining whether the number of slave station apparatuses belonging to the first wireless network as a slave station is the same as an predetermined upper limit or smaller than the predetermined upper limit; transmitting first wireless setting information to the target device through the specific interface, in a first case where the participation request is received and then it is determined that the number of the slave station apparatuses is smaller than the upper limit, the first wireless setting information being currently used in the first wireless network; transmitting second wireless setting information to the target device through the specific interface, in a second case where the participation request is received and then it is determined that the number of the slave station apparatuses is the same as the upper limit, the second wireless setting information being used in a second wireless network different from the first wireless network; and performing a communication of target data, in the first case, with the target device through the specific interface by using the first wireless network to which both the communication apparatus and the target device belong, after the first wireless setting information is transmitted to the target device, and performing a communication of the target data, in the second case, with the target device through the specific interface by using the second wireless network to which both the communication apparatus and the target device belong, after the second wireless setting information is transmitted to the target device.

According to the above configuration, the communication apparatus receives the participation request from the target device in a state where it belongs to the first wireless network as a master station. When it is determined that the number of the slave station apparatuses is smaller than the upper limit, the communication apparatus transmits the first wireless setting information to the target device. Thereby, the communication apparatus can appropriately perform communication of the target data with the target device by using the first wireless network. In the meantime, when it is determined that the number of the slave station apparatuses is the same as the upper limit, the communication apparatus transmits the second wireless setting information to the target device. Thereby, the communication apparatus can appropriately perform communication of the target data with the target device by using the second wireless network. Therefore, the communication apparatus can perform communication of the target data by using the second wireless network even in a situation where it is not possible to perform communication of the target data by using the first wireless network. Like this, the communication apparatus can execute the appropriate processing, depending on whether the number of the slave station apparatuses is the same as or smaller than the upper limit. As a result, the communication apparatus can appropriately perform communication of the target data with the target device.

A control method, a computer program and a computer-readable recording medium storing the computer program for implementing the communication apparatus are also novel and useful. Also, a communication system including the communication apparatus and the target device is also novel and useful.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Illustrative Embodiment (Configuration of Communication System 2)

Figure 1:
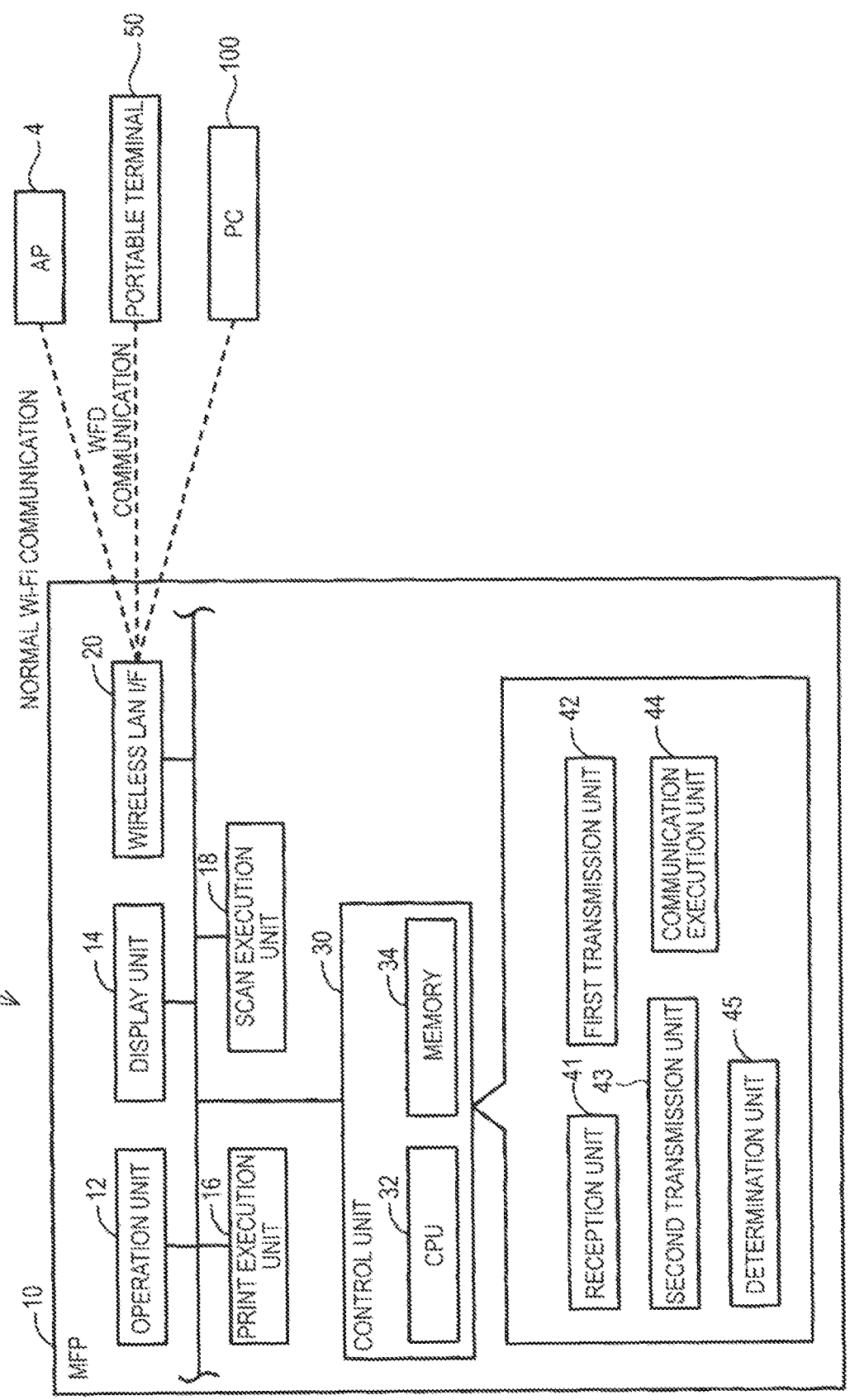
FIG. 1 illustrates a configuration of a communication system.

As shown in FIG. 1, a communication system 2 includes an AP (Access Point) 4, a multifunctional device 10 (hereinafter, referred to as 'MFP (Multi-Function Peripheral)'), a portable terminal 50 and a plurality of PCs (Personal Computers) 100.

(Configuration of MFP 10)

The MFP 10 is a peripheral device that can execute multi-functions including printing and scan functions. The MFP 10 has an operation unit 12, a display unit 14, a print execution unit 16, a scan execution unit 18, a wireless LAN interface 20 (hereinafter, an interface is referred to as 'I/F') and a control unit 30. The respective units 12 to 30 are connected to a bus line (a reference numeral thereof is omitted).

The operation unit 12 has a plurality of keys. A user can input a variety of instructions to the MFP 10 by operating the operation unit 12. The display unit 14 is a display for displaying a variety of information. The print execution unit 16 is a print system such as inkjet type and laser type. The scan execution unit 18 is a scan system such as CCD and CIS.

The wireless LAN I/F 20 is an interface for performing wireless communication and is physically one interface (i.e., one IC chip). The wireless LAN I/F 20 is allocated with both a MAC address (hereinafter, referred to as 'WFDMAC') that is used in wireless communication (hereinafter, referred to as 'WFD communication') based on a WFD (Wi-Fi Direct) mode and a MAC address (hereinafter, referred to as 'normal Wi-FiMAC') that is used in wireless communication (hereinafter, referred to as 'normal Wi-Fi communication') based on a normal Wi-Fi mode.

Specifically, the wireless LAN I/F 20 is beforehand allocated with the normal Wi-FiMAC. The control unit 30 generates a WFDMAC different from the normal Wi-FiMAC by using the normal Wi-FiMAC and allocates the same to the wireless LAN I/F 20. Therefore, the control unit 30 can execute both the normal Wi-Fi communication using the normal Wi-FiMAC and the WFD communication using the WFDMAC at the same time.

The control unit 30 has a CPU 32 and a memory 34. The CPU 32 executes a variety of processing (for example, processing shown in FIG. 2, which will be described later) in response to programs stored in the memory 34. The CPU 32 executes the processing in response to the programs, so that respective functions of respective units 41 to 45 are implemented. The memory 34 consists of a ROM, a RAM, a hard disk drive and the like.

(WFD and Normal Wi-Fi)

As described above, from a viewpoint of the MAC address that is used by the MFP 10, the WFD communication and the WFD mode are wireless communication and a wireless communication method in which the WFDMAC is used, respectively. Also, the normal Wi-Fi communication and the normal Wi-Fi mode are wireless communication and a wireless communication method in which the normal Wi-FiMAC is used, respectively.

(WFD)

The WFD mode is a wireless communication method that is set in the written standard 'Wi-Fi Peer-to-Peer (P2P) Technical Specification Version 1.1' prepared by the Wi-Fi Alliance. The WFD mode is a wireless communication method for performing wireless communication, based on IEEE (The Institute of Electrical and Electronics Engineers, Inc.) 802.11 standards and standards (for example, 802.11a, 11b, 11g, 11n and the like) acting on the 802.11 standards.

When using the normal Wi-FiMAC, the MFP 10 cannot belong to the wireless network in accordance with the WFD mode. When using the WFDMAC, the MFP 10 can belong to the wireless network in accordance with the WFD mode. In the below, a device that can belong to the wireless network in accordance with the WFD mode, such as the MFP 10, is referred to as 'WFD compatible device'. In the written standards of the WFD, three states of a Group Owner state (hereinafter, referred to as 'G/O state'), a client state (hereinafter, referred to as 'CL state') and a device state are defined as the WFD compatible device state. The WFD compatible device can selectively operate at one of the three states.

When a pair of WFD compatible devices at the device state should newly establish a wireless network, the pair of WFD compatible devices normally performs wireless communication referred to as G/O negotiation. In the G/O negotiation, the first WFD compatible device transmits information, which indicates a G/O priority of the first WFD compatible device, to the second WFD compatible device and receives information, which indicates a G/O priority of the second WFD compatible device, from the second WFD compatible device. The G/O priority of the WFD compatible device is an index indicating a degree that the WFD compatible device should be at the G/O state and is predetermined for the WFD compatible device. The first WFD compatible device compares two G/O priorities to thus determine that a device having a higher priority is to be the G/O state and that a device having a lower priority is to be the CL state. The second WFD compatible device determines a state of the second WFD compatible device by using the same method. After that, the pair of WFD compatible devices establishes connection to thereby establish a wireless network. In the below, a wireless network that is established as a result of the G/O negotiation is referred to as 'WFDNW'.

In a step where WFDNW is newly established by the G/O negotiation, only one G/O device and one CL device belong to the WFDNW. At this time, the G/O device may establish connection with other device to thus enable the other device to newly participate in the WFDNW as a CL device. In this case, two or more CL devices belong to the WFDNW. That is, in the WFDNW, one G/O device and one or more CL devices may exist. The G/O device manages one or more CL devices. Specifically, the G/O device registers MAC addresses of one or more CL devices with a management list in a memory of the G/O device.

An upper limit of the number of the CL devices that can be managed by the G/O device (i.e., an upper limit of the number of the MAC addresses of the CL devices that can be registered with the management is predetermined by the G/O device. In this illustrative embodiment, the upper limit of the number of the CL devices that can be managed by the MFP 10 is an integer of 2 or larger. In a modified embodiment, the upper limit of the number of the CL devices that can be managed by the MFP 10 may be 1 (one). That is, the upper limit of the number of the CL devices that can be managed by the MFP 10 may be an integer of 1 or larger.

Also, the CL device is disconnected from the WFDNW, the G/O device deletes the MAC address of the corresponding CL device from the management list. In the meantime, when the number of the CL devices becomes zero (that is, when the number of the MAC addresses of the CL devices registered with the management list becomes zero), the G/O device shifts from the G/O state to the device state and removes the WFDNW.

The G/O device can perform wireless communication of target data with the CL device registered with the management list, without going through the other device. The target data is data including information of a network layer of an OSI reference model and information of an upper layer (for example, an application layer) of the network layer, and includes print data, scan data and the like, for example. Also, the G/O device can relay wireless communication of the target data between the CL devices. In other words, the pair of CL devices can perform wireless communication of the target data through the G/O device.

As described above, in the WFDNW, it is possible to perform wireless communication of the target data between the WFD compatible device of a transmission source of the target data and the WFD compatible device of a transmission destination of the target data, without going through an AP (for example, an AP 4) separately configured from the WFD compatible devices. That is, it can be said that the WFD communication and the WFD mode are wireless communication without going through an AP and a wireless communication method in which an AP is not used. In the meantime, this AP (for example, an AP 4) is a normal AP that is referred to as a wireless access point, a wireless LAN router and the like, and it is different from a G/O device of the WFD mode and a so-called SoftAP of the normal Wi-Fi mode.

Also, the G/O device cannot perform wireless communication of the target data with a device-state device (i.e., the WFD compatible device at the device state) but can perform wireless communication of connection data for establishing connection with the device-state device. That is, the G/O device can perform wireless communication of connection data with the device-state device to thereby establish connection with the device-state device, thereby enabling the device-state device to newly participate in the WFDNW. In other words, the device-state device can perform wireless communication of connection data with the G/O device to thus establish connection with the G/O device, thereby newly participating in the WFDNW. In this case, the device-state device shifts from the device state to the CL state (i.e., the device-state device participates in the WFDNW as the CL device). The connection data is data (i.e., data not including information of the network layer) including information of a lower layer (for example, a physical layer and a data link layer) of the network layer of the OSI reference model, and includes a Probe Request signal, a Probe Response signal, an Association Request signal, an Association Response signal, an Authentication Request signal, an Authentication Response signal, a 4-Way Handshake signal and the like.

Also, the G/O device cannot perform wireless communication of the target data with a WFD non-compatible device but can perform wireless communication of the connection data with a WFD non-compatible device. The WFD non-compatible device is a device that cannot belong to a wireless network in accordance with the WFD mode but can belong to a wireless network in accordance with the normal Wi-Fi mode. The G/O device can perform wireless communication of the connection data with the WFD non-compatible device to thereby establish connection with the WFD non-compatible device, thereby enabling the WFD non-compatible device to newly participate in the WFDNW. In other words, the WFD non-compatible device can perform wireless communication of the connection data with the G/O device to thus establish connection with the G/O device, thereby newly participating in the WFDNW. The WFD non-compatible device does not selectively operate at any one of the three states (i.e., the G/O state, the CL state and the device state) but operates at the same state as the CL state while belonging to the WFDNW.

(Normal Wi-Fi)

The normal Wi-Fi mode is a wireless communication method that is defined by the Wi-Fi Alliance and is different from the WFD mode. The normal mode is a wireless communication method that performs wireless communication in accordance with IEEE 802.11 standards and standards (for example, 802.11a, 11b, 11g, 11n and the like) acting on the 802.11 standards, like the WFD mode.

While the WFD mode is a wireless communication method having a system of G/O negotiation, the normal Wi-Fi mode is a wireless communication method having no such system. Also, while the WFD mode is a wireless communication method allowing a selective operation at any one of the three states (i.e., the G/O state, the CL state and the device state), the Wi-Fi mode is a wireless communication method not allowing the selective operation. In these regards, the WFD mode is different from the normal mode.

The normal Wi-Fi mode is classified into an infrastructure mode (hereinafter, simply referred to as 'Infra') and an ad hoc mode (hereinafter, simply referred to as 'ad hoc'). Generally speaking, the Infra is a mode in which an AP is used, and the ad hoc is a mode in which an AP is not used.

(Infra)

A wireless network of the Infra (hereinafter, referred to as 'Infra NW') is established by the AP 4. The MFP 10 can establish connection based on an Infra of the normal Wi-Fi mode between the MFP 10 and the AP 4 by using the normal Wi-FiMAC. Thereby, the MFP 10 newly participates in the Infra NW. In this process, the MFP 10 does not execute the G/O negotiation and does not selectively determine an operation at the G/O state or CL state. The MFP 10 can perform wireless communication of the target data with another device (for example, the PC 100) belonging to the normal Wi-Fi through the AP 4.

(Ad Hoc)

A wireless network of ad hoc (hereinafter, referred to as 'ad hoc NW') is established by a pair of devices different from the AP. That is, a pair of devices (for example, the MFP 10 and the portable terminal 50) can establish connection based on the ad hoc of the normal Wi-Fi mode between the pair of devices to thereby establish an ad hoc NW, without using the AP or SoftAP method. In this process, the pair of devices does not execute the G/O negotiation and does not selectively determine an operation at the G/O state or CL state. Meanwhile, in this illustrative embodiment, only one pair of devices can belong to one ad hoc NW. That is, three or more devices cannot belong to one ad hoc NW.

(Wireless Connection Method (PBC Method))

As described above, the MFP 10 can establish connection (i.e., wireless connection) based on the WFD mode or normal Wi-Fi mode between the MFP 10 and the other device (for example, the portable terminal 50, the AP 4 and the like). The MFP 10 supports a wireless connection method of a push button method (hereinafter, referred to as 'PBC method') of WPS (Wi-Fi Protected Setup).

The PBC method of WPS is a method for establishing wireless connection between a pair of devices by transmitting (i.e., performing WPS communication) wireless setting information from one device to the other device, even though a PIN code is not displayed and input in the pair of devices when a predetermined operation is executed in each of the pair of devices. The wireless setting information is setting information that is used in the wireless network (WFDNW, normal Wi-FiNW and the like), and includes an authentication method, an encryption method, a password, an SSID (Service Set Identifier), a BSSID (Basic Service Set Identifier) and the like. Meanwhile, in a modified embodiment, the MFP 10 may support an AOSS (registered trademark), an AOSS2, an SES (Secure Easy Setup; registered trademark) and the like, instead of the PBC method. These are the same as the PBC method of WPS.

In the meantime, the MFP 10 does not support a PIN code method of WPS. The PIN code method of WPS is a method for establishing wireless connection between a pair of devices by transmitting (i.e., performing WPS communication) wireless setting information from one (or the other) device to the other (or one) device, when a PIN code is displayed on one device and the PIN code is input to the other device.

(Information to be Stored in Memory of MFP 10)

The memory 34 of the MFP 10 stores therein a WFD state value indicating a current state (i.e., the G/O state, the CL state or the device state) of the MFP 10 relating to the WFD mode. Also, when the MFP 10 belongs to the WFDNW, the memory 34 stores therein wireless setting information (hereinafter, referred to as WDFWSI (WFD Wireless Setting Information)) that is used in the WFDNW.

When the MFP 10 belongs to the normal Wi-FiNW, the memory 34 also stores therein NW information, which indicates a type (Infra or ad hoc) of the normal Wi-FiNW. When the MFP 10 belongs to the Infra NW (i.e., when the NW information indicating the Infra is stored), the memory 34 also stores therein wireless setting information (hereinafter, referred to as 'WSI of the infra') that is used in the Infra NW. When the MFP 10 belongs to the ad hoc NW (i.e., when the NW information indicating the ad hoc is stored), the memory 34 also stores therein wireless setting information (hereinafter, referred to as 'WSI of the ad hoc') that is used in the ad hoc NW.

(Configurations of Other Devices)

A plurality of PCs 100 includes a desktop PC, a notebook PC, a tablet PC and the like. The PC 100 can perform WFD communication and normal Wi-Fi communication. The portable terminal 50 is a portable terminal apparatus such as a portable phone (for example, smart phone), a PDA, a notebook PC, a tablet PC, a portable music reproduction apparatus, a portable moving picture reproduction apparatus and the like. The portable terminal 50 can perform WFD communication and normal Wi-Fi communication.

The portable terminal 50 stores therein an application (hereinafter, referred to as 'application for MFP') for enabling the MFP 10 to execute functions (for example, print function, scan function and the like). The application for MFP may be installed into the portable terminal 50 from a server, which is provided by a vendor of the MFP 10, or may be installed into the portable terminal 50 from a media, which is shipped together with the MFP 10.

Figure 2:
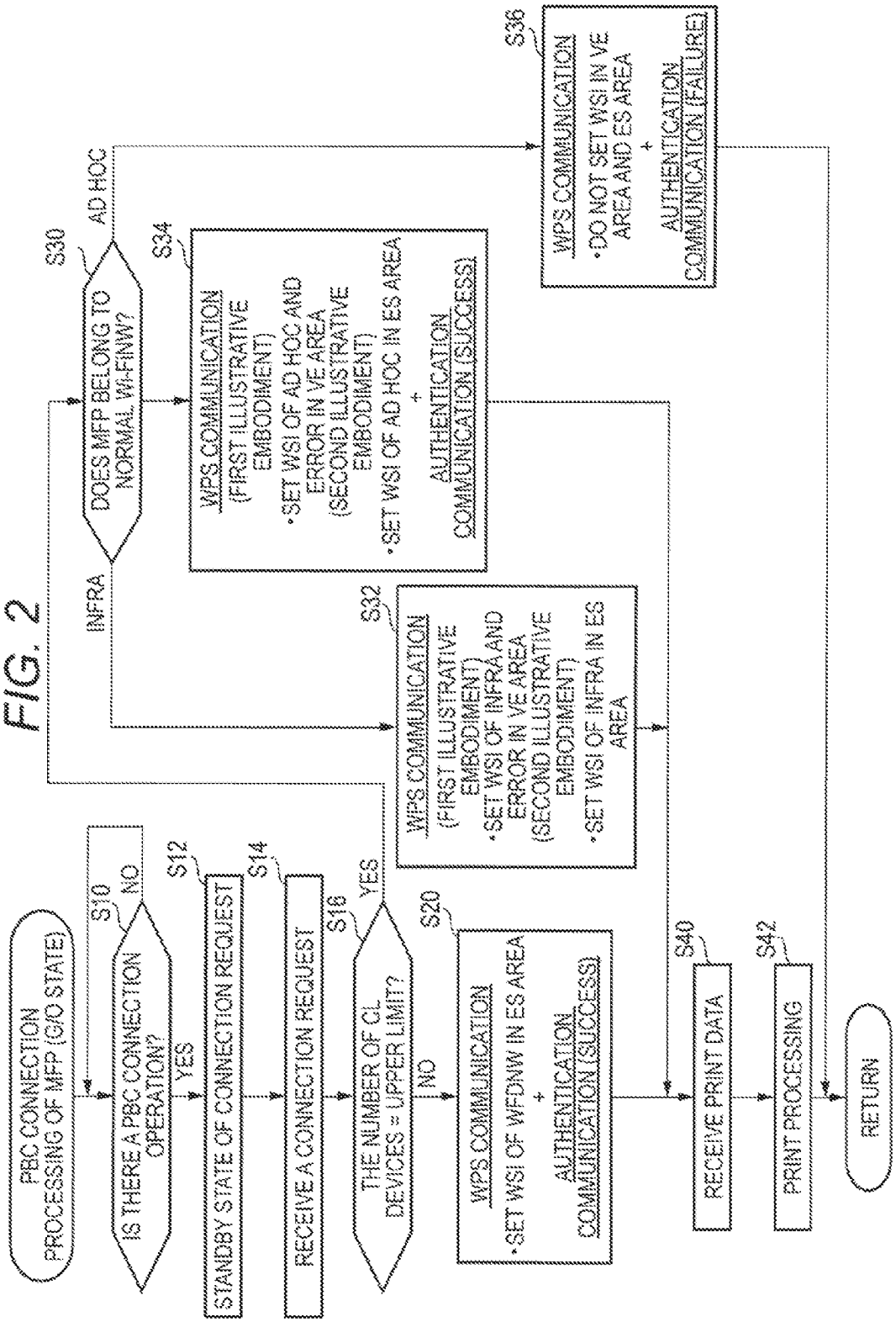
FIG. 2 illustrates a flowchart of PBC connection processing of an MFP.

(PBC Connection Processing of MFP 10; FIG. 2)

In the below, processing that is executed by the MFP 10 is described with reference to FIG. 2. FIG. 2 is a flowchart of processing that is executed by the MFP 10 when the MFP 10 is at the G/O state (i.e., when the WFD state value in the memory 34 is a value indicating the G/O state). The descriptions of processing, which is executed by the MFP 10 when the MFP 10 is at the CL state or device state, are omitted.

Also, FIG. 2 illustrates a flowchart of processing that is executed by the MFP 10 when an operation (a PBC connection operation that will be described later) for wireless connection of the WFD mode is input to the MFP 10. In the meantime, when a wireless connection operation of the normal Wi-Fi mode is input, the MFP 10 establishes connection of the normal Wi-Fi mode between the MFP 10 and the AP 4 in accordance with a well-known method. The description of this processing is omitted.

In below descriptions, a situation is assumed in which a user of the portable terminal 50 at the device state enables the MFP 10 at the G/O state to print an image, which is represented by data (i.e., print data) stored in the portable terminal 50.

When a user of the portable terminal 50 wants the MFP 10 to execute a printing operation, based on print data stored in the portable terminal 40, the user selects an item indicating 'wireless connection of the WFD mode' from a plurality of items (for example, 'wireless connection of the WFD mode' and 'wireless connection of the normal Wi-Fi mode') included in a screen that is displayed on the display unit 14 of the MFP 10. Then, the user selects an item indicating 'PBC method' included in the screen that is displayed on the display unit 11 (hereinafter, referred to as 'PBC connection operation'). When the PBC connection operation is applied to the operation unit 12, the control unit 30 of the MFP 10 at the G/O state determines YES in S10 and executes respective processing after S12.

The description that the respective processing after S12 is executed is that the MFP 10 belongs to the WFDNW (hereinafter, referred to as 'WFDNW (MFP=G/O)'), as the G/O device. In S12, a reception unit 41 shifts the MFP 10 to a standby state of a connection request (i.e., Association Request signal) for requesting connection establishment of the PBC method. When a device (for example, the MFP 10) is at the standby state of the connection request, the device can receive a connection request and transmit a response (i.e., Association Response signal) indicating OK. On the other hand, when a device is not at the standby state of the connection request, the device does not transmit an OK response even though it receives a connection request (for example, it transmits a response indicating NG).

As described later, the user of the portable terminal 50 starts the application for MFP to thereby execute a variety of operations (for example, an operation corresponding to the PBC connection operation in the MFP 10) (refer to S50 and S54 in FIG. 3). As a result, the portable terminal 50 transmits a connection request, which includes the WFDMAC of the MFP 10 as a transmission destination) (refer to S56 in FIG. 3).

In S14, the reception unit 41 receives the connection request including the WFDMAC of the MFP 10 from the portable terminal 50 through the wireless LAN I/F 20. As described above, in S12, the MFP 10 at the G/O state is shifted to the standby state of the connection request. Therefore, in S14, the control unit 30 transmits An OK response (i.e., Association Response signal) to the portable terminal 50 through the wireless LAN I/F 20. In the meantime, the connection request and the response include the information of the physical layer and the data link layer of the OSI reference model and don't include the information of communication layers of the network layer or higher.

Subsequently, in S16, a determination unit 45 determines whether the number of the CL devices, which are currently managed by the MFP 10 at the G/O state, is the same as a predetermined upper limit. Specifically, the determination unit 45 specifies the number of the MAC addresses of the CL devices, which are registered with the management list in the memory 34, and determines whether the number is the same as the upper limit. When the number of the CL devices is the same as the upper limit, the determination unit 45 determines YES in S16 and proceeds to S30. As described above, the upper limit of the number of the CL devices, which can be connected to the MFP 10 at the G/O state, is predetermined. Therefore, when a result of the determination in S16 is YES, the control unit 30 tries to enable the portable terminal 50 to belong to the normal Wi-FiNW after S30, because the portable terminal 50 cannot belong to the WFDNW (MFP=G/O). On the other hand, when the number of the CL devices is smaller than the upper limit, the determination unit 45 determines NO in S16 and proceeds to S20. In this case, the control unit 30 executes processing for enabling the portable terminal 50 to belong to the WFDNW (MFP=G/O) in S20.

Figure 3:
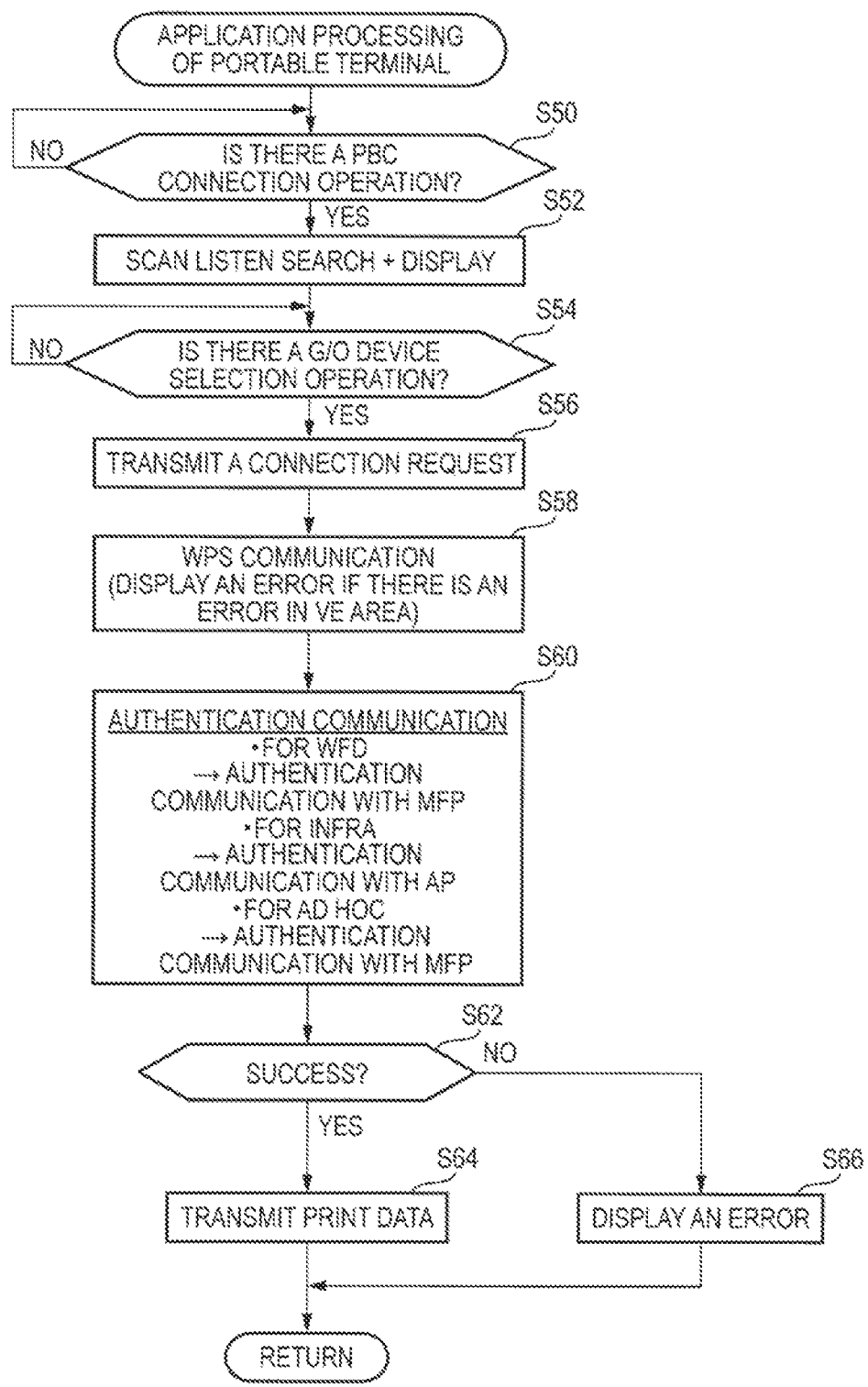
FIG. 3 illustrates a flowchart of application processing of a portable terminal.

As described above, in S10, the PBC connection operation is applied to the MFP 10 and the PBC connection operation is also applied to the portable terminal 50 (refer to S50 in FIG. 3). Therefore, a condition for performing WPS communication of the PBC method is satisfied. Thus, in S20, a first transmission unit 42 performs WPS communication through the wireless LAN I/F 20 to thereby transmit the WFDWSI (i.e., WFDWSI in the memory 34), which is currently used in the WFDNW (MFP=G/O), to the portable terminal 50. Each packet that is transmitted and received by the WPS communication includes the information of the physical layer and the data link layer of the OSI reference model and does not include the information of the network layer or higher layer. That is, the first transmission unit 42 transmits the WFDWSI to the portable terminal 50 without using the of the network layer or higher layer.

Figure 7:
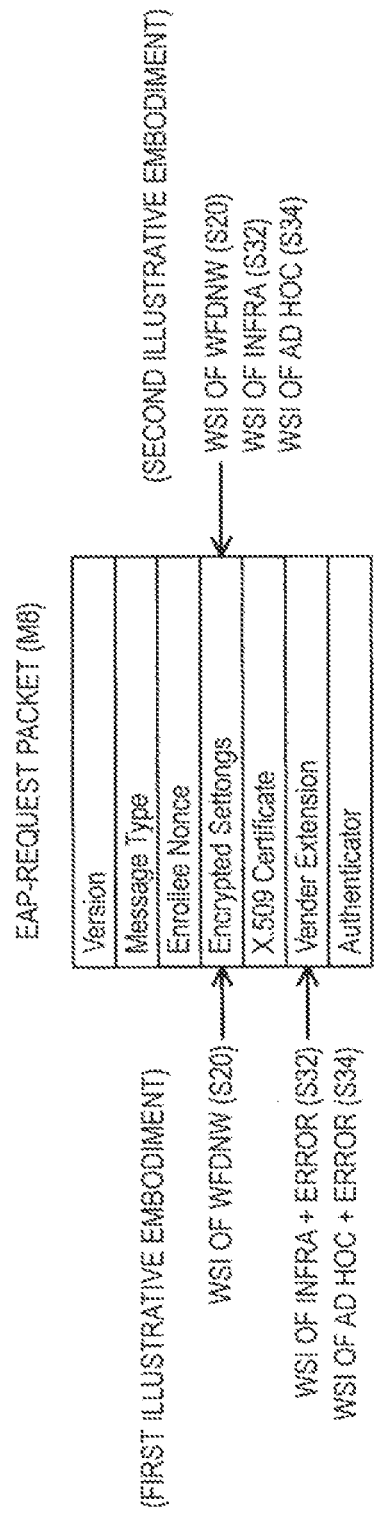
FIG. 7 illustrates a configuration of a M8 packet.

FIG. 7 illustrates a configuration of an EAP (Extensible Authentication Protocol)-Request packet (M8) that is transmitted to the portable terminal 50 from the MFP 10. Meanwhile, in the below, the packet shown in FIG. 7 is referred to as 'M8 packet'. The M8 packet includes a plurality of attribute areas (a Version area, a Message Type area and the like) in which a variety of information is set. In S20, the first transmission unit 42 sets the WFDWSI in an Encrypted Setting area (hereinafter, referred to as 'ES area') of the attribute areas when generating the M8 packet. The ES area is an area in which wireless setting information to be transmitted by the WPS communication is set. In the meantime, the first transmission unit 42 does not describe any in a Vendor Extension area (hereinafter, referred to as 'VE area') of the attribute areas. The VE area is an area in which a variety of information is set in accordance with a predetermined program (for example, a program in the MFP 10) provided by the vendor of the MFP 10. The first transmission unit 42 transmits the M8 packet including the ES area, in which the WFDWSI is set, to the portable terminal 50, thereby transmitting the WFDWSI to the portable terminal 50.

The WFDWSI that is transmitted to the portable terminal 50 in S20 is information that is prepared by the MFP 10 when it is determined that the MFP 10 be at the G/O state by executing the G/O negotiation. The method with which the MFP 10 prepares the WFDWSI is as follows. That is, the MFP 10 (i.e., the control unit 30) specifies an authentication method and an encryption method, which have been predetermined. The MFP 10 specifies a predetermined password or newly generates a password, thereby preparing a password. The MFP 10 specifies a predetermined SSID or newly generates an SSID, thereby preparing an SSID. In this illustrative embodiment, the MFP 10 specifies the predetermined WFD-MAC as a BSSID.

When the portable terminal 50 receives the M8 packet from the MFP 10 (refer to S58 in FIG. 3), the portable terminal extracts the WFDWSI set in the ES area of the M8 packet to thus request the MFP 10 to perform authentication communication, based on the WFDWSI (i.e., the portable terminal transmits the Authentication Request signal; refer to S60 in FIG. 3).

In S20, the control unit 30 also performs authentication communication (i.e., communication such as 4-Way Handshake signal and the like) in accordance with the authentication request received from the portable terminal 50, thereby executing authentication of the portable terminal 50. Since the authentication is executed on the basis of the WFDWSI transmitted from the MFP 10 to the portable terminal 50, the authentication normally succeeds. Thereby, the control unit 30 establishes connection of the WFD mode between the MFP 10 and the portable terminal 50. Then, the control unit 30 registers a MAC address of the portable terminal 50 with the management list of the MFP 10. Thereby, the portable terminal 50 newly participates in the WFDNW (MFP=G/O) as the CL device. When the processing of S20 is over, the processing proceeds to S40.

Meanwhile, in S30, the determination unit 45 determines whether the MFP 10 currently belongs to the normal Wi-FiNW. Specifically, when the NW information in the memory 34 indicates the Infra, the determination unit 45 determines that the MFP 10 currently belongs to the Infra NW and proceeds to S32. Also, when the NW information in the memory 34 indicates the ad hoc, the determination unit 45 determines that the MFP 10 currently belongs to the ad hoc NW and proceeds to S36. Also, when the NW information is not stored in the memory 34, the determination unit 45 determines that the MFP 10 does not currently belong to the normal Wi-FiNW and proceeds to S34.

As described above, the condition for performing WPS communication of the PBC method in the MFP 10 and the portable terminal 50 is satisfied. Therefore, the WPS communication is performed in S32, S34 and S36. However, the contents of the WPS communications in the respective processing are different.

In S32 (i.e., MFP 10=Infra NW), a second transmission unit 43 performs WPS communication through the wireless LAN I/F 20 to thereby transmit the WSI of the Infra (i.e., WSI of the Infra in the memory 34), which is currently used in the Infra NW, to the portable terminal 50. The WSI of the Infra, which is transmitted to the portable terminal 50 in S32, is information (i.e., information prepared by the AP 4 in the Infra NW to which the MFP 10 currently belongs) acquired from the AP 4 when the MFP 10 was connected to the AP 4. In the meantime, the second transmission unit 43 transmits the WSI of the Infra to the portable terminal 50 without using the network layer or higher layer.

In S32, the second transmission unit 43 does not describe the wireless setting information (for example, WFDWSI or WSI of the infra) in the ES area of the M8 packet (refer to FIG. 7), unlike S20. The second transmission unit 43 sets the WSI of the Infra and an error message, which indicates that the connection of the WFD mode cannot be established, in the VE area of the M8 packet. Specifically, the error message includes a message indicating that the AP 4 is connected to the portable terminal 50. Then, the second transmission unit 43 transmits the M8 packet, which includes the VE area having the WSI of the Infra set therein, to the portable terminal 50, thereby transmitting the WSI of the Infra to the portable terminal 50.

The ES area of the M8 packet is an area in which only the wireless setting information should be set. Therefore, the error message and the like cannot be set in the ES area. Thus, the second transmission unit 43 sets the error message in the VE area in which the vendor of the MFP 10 can freely describe the information. Thereby, the portable terminal 50 can display the error message set in the VE area (refer to S58 of FIG. 3, which will be described later).

When the portable terminal 50 receives the M8 packet from the MFP 10 (refer to S58 in FIG. 3), the portable terminal recognizes that the wireless setting information is not set in the ES area of the M8 packet, and extracts the information in the VE area (i.e., the WSI of the Infra and the error message). The portable terminal 50 displays the error message on a display unit of the portable terminal 50 and requests the AP 4 to perform authentication communication, based on the WSI of the Infra (refer to S60 in FIG. 3). Thereby, the connection of the normal Wi-Fi mode is established between the AP 4 and the portable terminal 50. As a result, a state where the MFP 10 and the portable terminal 50 belong to the Infra NW is established. When the processing of S32 is over, the processing proceeds to S40.

Meanwhile, in S34 (i.e., MFP 10 is no normal Wi-FiNW), the control unit 30 prepares the WSI of the ad hoc for establishing the ad hoc NW. The method of preparing the WSI of the ad hoc is the same as that of preparing the WFDWSI. However, the control unit 30 prepares the predetermined normal Wi-FiMAC as a BSSID. Then, the second transmission unit 43 performs WPS communication through the wireless LAN I/F 20 to thereby transmit the prepared WSI of the ad hoc to the portable terminal 50. In the meantime, the second transmission unit 43 transmits the WSI of the ad hoc to the portable terminal 50 without using the communication layers of the network layer or higher.

Like S32, the second transmission unit 43 sets the WSI of the ad hoc and an error message, which indicates that the connection of the WFD mode cannot be established, in the VE area of the M8 packet. Specifically, the error message includes a message indicating that the portable terminal 50 is connected with the ad hoc. Then, the second transmission unit 43 transmits the M8 packet, which includes the VE area having the WSI of the ad hoc set therein, to the portable terminal 50, thereby transmitting the WSI of the ad hoc to the portable terminal 50.

When the portable terminal 50 receives the M8 packet from the MFP 10 (refer to S58 in FIG. 3), the portable terminal extracts the information in the VE area (i.e., the WSI of the ad hoc and the error message). The portable terminal 50 displays the error message and requests the MFP 10 to perform authentication communication based on the WSI of the ad hoc (refer to S60 in FIG. 3).

In S34, the control unit 30 performs authentication communication in accordance with the authentication request received from the portable terminal 50, thereby executing authentication of the portable terminal 50. Since the authentication is executed on the basis of the WSI of the ad hoc transmitted from the MFP 10 to the portable terminal 50, the authentication normally succeeds. Thereby, the control unit 30 establishes connection of the normal Wi-Fi mode between the MFP 10 and the portable terminal 50, thereby newly establishing the ad hoc NW. As a result, a state where the MFP 10 and the portable terminal 50 belong to the ad hoc NW is established. When the processing of S34 is over, the processing proceeds to S40.

In the meantime, the description that the processing of S36 is executed means that the MFP 10 already belongs to the ad hoc NW, i.e., that the MFP 10 establishes the ad hoc NW with a device, other than the portable terminal 50. As described above, in this illustrative embodiment, three or more devices cannot belong to the ad hoc NW. Therefore, while the processing of S36 is executed, the portable terminal 50 cannot participate in the ad hoc NW, so that there is no method of communicating print data between the MFP 10 and the portable terminal 50. Thus, in S36, the control unit 30 performs WPS communication through the wireless LAN I/F 20 but does not transmit the wireless setting information (WFDWSI, WSI of the ad hoc and the like) to the portable terminal 50.

That is, the control unit 30 does not describe the wireless setting information (WFDWSI and WSI of the ad hoc) in the ES and VE areas of the M8 packet. Then, the control unit 30 transmits the M8 packet to the portable terminal 50.

When the portable terminal 50 receives the M8 packet from the MFP 10 (refer to S58 in FIG. 3), the portable terminal 50 recognizes that the wireless setting information is set in the ES and VE areas and further tries to perform authentication communication (refer to S60 in FIG. 3). At this time, since the portable terminal 50 does not use the wireless setting information, the authentication fails (NO in S62). Therefore, the MFP 10 and the portable terminal 50 cannot belong to the same wireless network.

Since there is no method of communicating print data between the MFP 10 and the portable terminal 50, when the processing of S36 is over, the processing skips over S40 and S42 and returns to S10.

In S40, a communication execution unit 44 receives the print data from the portable terminal 50 through the wireless LAN I/F 20. The print data is data that is stored in the portable terminal 50 (for example, image data, web data and the like) and is data that is designated as a print target by the user.

In a situation where the processing of S40 is executed via S20, the MFP 10 is the G/O device and the portable terminal 50 is the CL device. In this situation, the communication execution unit 44 receives the print data from the portable terminal 50 without going through the other apparatus. Also, in a situation where the processing of S40 is executed via S32, the MFP 10 and the portable terminal 50 belong to the Infra NW. In this situation, the communication execution unit 44 receives the print data from the portable terminal 50 through the AP 4 in the Infra NW. Also, in a situation where the processing of S40 is executed via S34, the MFP 10 and the portable terminal 50 belong to the ad hoc NW. In this situation, the communication execution unit 44 receives the print data from the portable terminal 50 without going through the other apparatus.

In the meantime, the print data includes the information of the application layer of the OSI reference model. Therefore, in any of the above situations, the communication execution unit 44 performs communication of the print data by using the network layer or higher layer of the OSI reference model, unlike the WPS communication of S20, S32 and S34.

Then, in S42, the control unit 30 supplies the print data to the print execution unit 16. Thereby, the print execution unit 16 prints an image, which is indicated by the print data, on a printing medium. The user of the portable terminal 50 can acquire the printed printing medium. When the processing of S42 is over, the processing returns to S10.

(Application Processing of Portable Terminal 50; FIG. 3)

Subsequently, processing that the portable terminal 50 executes in accordance with an application for MFP is described with reference to FIG. 3.

When a user of the portable terminal 50 wants the MFP 10 to execute a printing operation, based on the print data in the portable terminal 50, the user starts an application for MFP. Then, the user selects an item, which indicates the 'wireless connection of 'WFD', on a screen relating to the application for MFP, and further selects an item indicating the 'PBC method' (i.e., executes the 'PBC connection operation'). In this case, the portable terminal 50 determines YES in S50 and proceeds to S52.

In S52, the portable terminal 50 executes an SLS (Scan Listen Search). The SLS is wireless communication for searching one or more neighbor devices (for example, the MFP 10) exiting in the vicinity of an execution device (for example, the portable terminal 50) executing the SLS, and includes Scan processing, Listen processing and Search processing.

The Scan processing is processing of transmitting a Probe Request signal and receiving a Probe Response signal, thereby searching the G/O device and the AP existing in the vicinity of the execution device. The Listen processing is processing of receiving the Probe Request signal and transmitting the Probe Response signal, thereby notifying the neighbor device, which exists in the vicinity of the execution device, of the existence of the execution device. The Search processing is processing of transmitting the Probe Request signal and receiving the Probe Response signal, thereby searching a device-state device existing in the vicinity of the execution device. Meanwhile, in the SLS, it is not possible to generally find out the CL device existing in the vicinity of the execution device. The Probe Response signal that is received in the Scan processing and the Search processing includes a MAC address, a device name and the like of the neighbor device. Therefore, the execution device can acquire MAC addresses, device names and the like of one or more neighbor devices.

In S52, the portable terminal 50 executes the SLS to thereby display a device list indicating information (the MAC address, the device name and the like) relating to the one or more neighbor devices. The device list includes information about the MFP 10 at the G/O state. The user selects the MFP 10 from the device list. In this case, the portable terminal 50 determines YES in S54 and proceeds to S56.

In S56, the portable terminal 50 transmits a connection request including the WFDMAC of the MFP 10 as a transmission destination. As a result, in S14 of FIG. 2, the MFP 10 receives the connection request from the portable terminal 50 and transmits an OK response to the portable terminal 50.

In S58, the portable terminal 50 performs WPS communication with the MFP 10 to thus receive any one M8 packet (refer to FIG. 7) of following (A) to (D) from the MFP 10. (A) The portable terminal 50 receives the M8 packet including the ES area having the WFDWSI set therein (S20 in FIG. 2). In this case, the portable terminal 50 proceeds to S60 without displaying an error message. (B) The portable terminal 50 receives the M8 packet including the VE area having the WSI of the Infra set therein (S32 in FIG. 2). In this case, the portable terminal 50 displays the error message (i.e., a message indicating that the portable terminal 50 is connected to an AP) in the VE area and proceeds to S60. (C) The portable terminal 50 receives the M8 packet including the VE area having the WSI of the ad hoc set therein (S34 in FIG. 2). In this case, the portable terminal 50 displays the error message a message indicating that the portable terminal 50 is connected with the ad hoc) in the VE area and proceeds to S60. (D) The portable terminal 50 receives the M8 packet not including the wireless setting information (S36 in FIG. 2). In this case, the portable terminal 50 proceeds to S60 without displaying an error message.

In S60, the portable terminal 50 uses any one method of following (A) to (D), thereby performing authentication communication. (A) When the portable terminal 50 receives the M8 packet including the WFDWSI (S20 in FIG. 2), the portable terminal 50 requests the MFP 10 to perform authentication communication on the basis of the WFDWSI. (B) When the portable terminal 50 receives the M8 packet including the WSI of the Infra (S32 in FIG. 2), the portable terminal 50 requests the AP 4 to perform authentication communication on the basis of the WSI of the infra. (C) When the portable terminal 50 receives the M8 packet including the WSI of the ad hoc (S34 in FIG. 2), the portable terminal 50 requests the MFP 10 to perform authentication communication on the basis of the WSI of the ad hoc. (D) When the portable terminal 50 receives the M8 packet not including the wireless setting information (S36 in FIG. 2), the portable terminal 50 tries the authentication communication.

In S62, the portable terminal 50 determines whether the authentication communication is successful. In the (A) to (C) cases, since the authentication generally succeeds, the portable terminal 50 determines YES in S62 and proceeds to S64.

Meanwhile, in the (D) case, since the authentication fails, the portable terminal 50 determines NO in S62 and proceeds to S66.

In S64, the portable terminal 50 transmits the print data to the MFP 10. The print data is transmitted from the portable terminal 50 to the MFP 10, as described in S40 of FIG. 2. Meanwhile, in S66, the portable terminal 50 displays an error message indicating that the authentication fails. The error message is not a message set in the M8 packet but a message beforehand stored in the portable terminal 50. When the processing of S64 and S66 are over, the processing returns to S50.

SPECIFIC EXAMPLES

Figure 4:
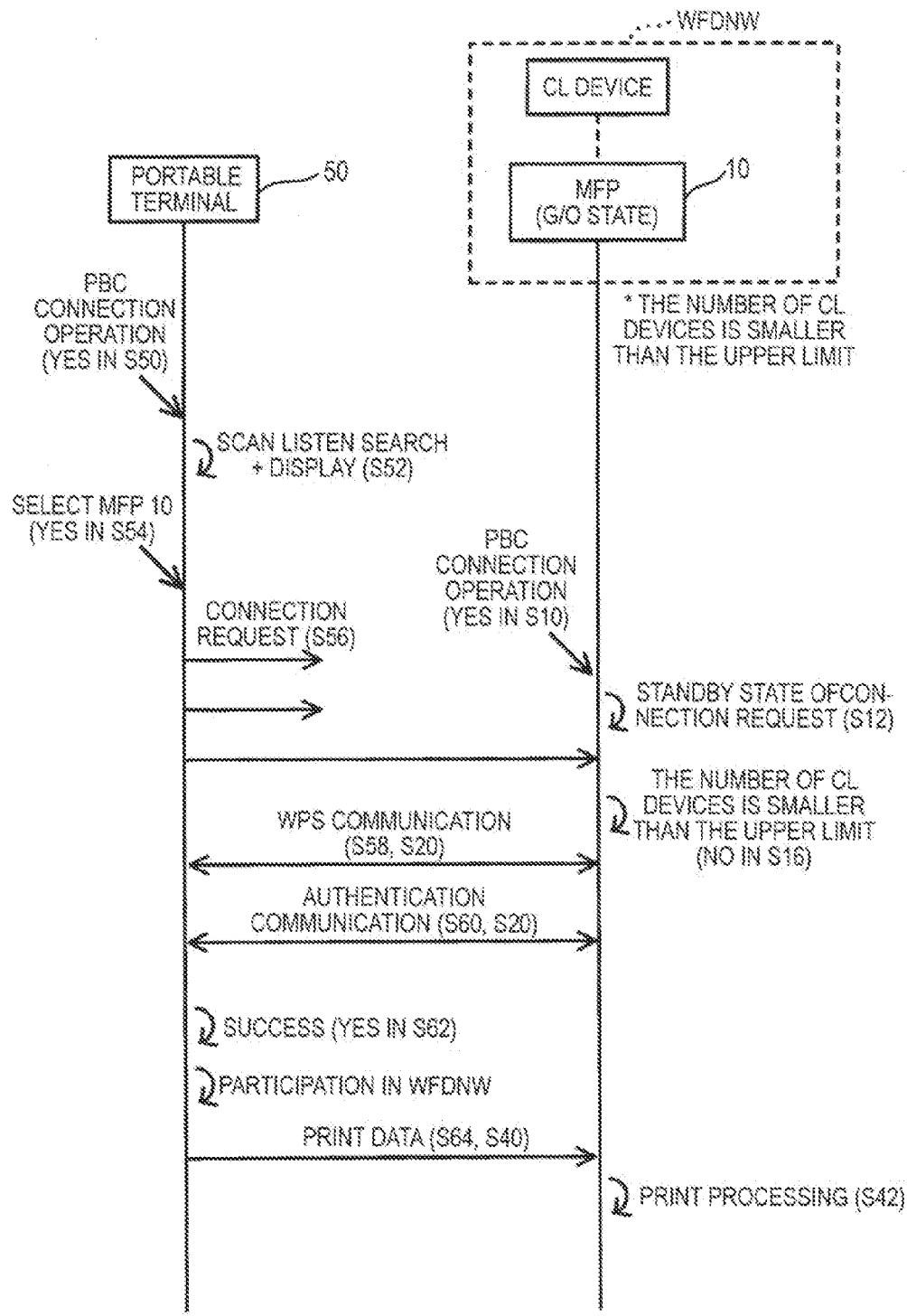
FIG. 4 is a sequence diagram illustrating a case A where the number of CL devices belonging to WFDNW is smaller than an upper limit.
Figure 5:
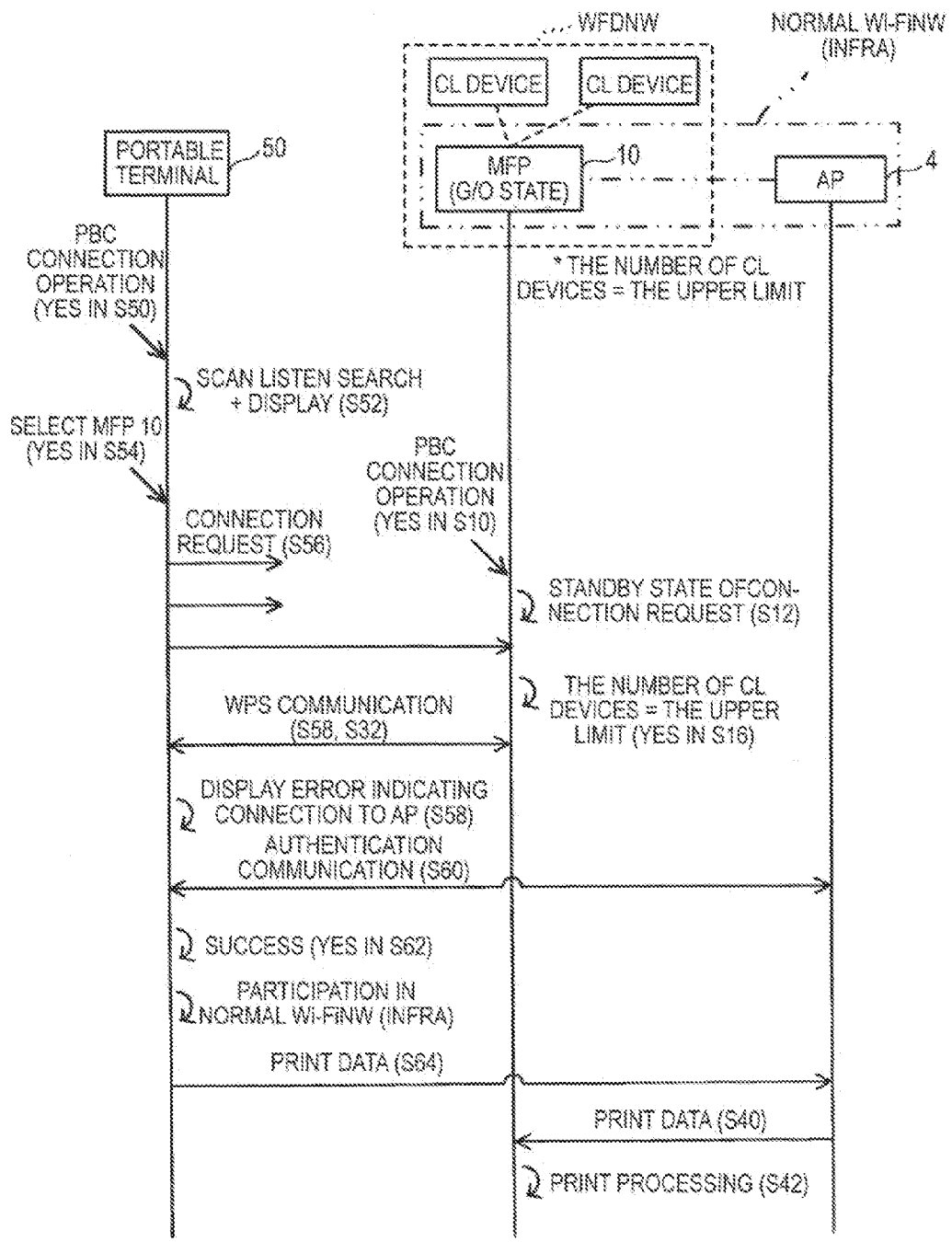
FIG. 5 is a sequence diagram illustrating a case B where the number of CL devices belonging to the WFDNW is the same as the upper limit.
Figure 6:
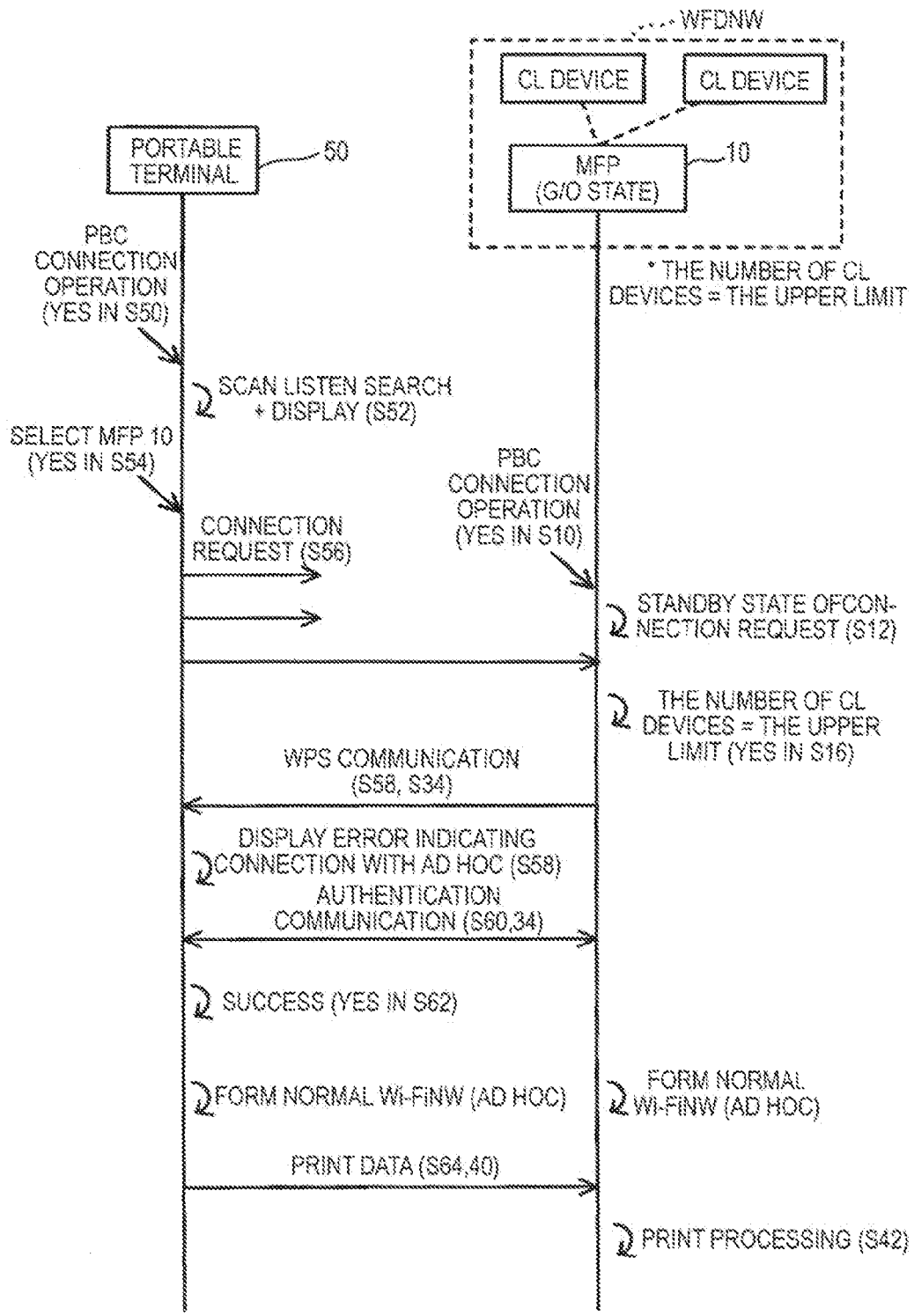
FIG. 6 is a sequence diagram illustrating a case C where the number of CL devices belonging to the WFDNW is the same as the upper limit.

Subsequently, specific examples that are implemented by the MFP 10 and the portable terminal 50 are set with reference to FIGS. 4 to 6. The MFP 10 and the portable terminal 50 execute the respective processing of FIG. 2 and FIG. 3, so that cases A to C of FIGS. 4 to 6 are implemented. The case A of FIG. 4 is a case where the processing is executed via S20 of FIG. 2. The case B of FIG. 5 is a case where the processing is executed via S32 of FIG. 2. The case C of FIG. 6 is a case where the processing is executed via S34 of FIG. 2.

(FIG. 4; Case A)

At an initial state of the case A in FIG. 4, the WFDNW (MFP=G/O) is established in which the MFP 10 is a G/O device. The number of the CL devices belonging to the WFDNW (MFP=G/O) is smaller than the upper limit.

When a user wants the MFP 10 at the G/O state to execute a printing operation by using the portable terminal 50 at the device state, the user starts the application for MFP to thus input a PBC connection operation to the portable terminal 50 (YES in S50 of FIG. 3). In this case, the portable terminal 50 executes the SLS and displays the device list indicating the information about the MFP 10 at the G/O state (S52).

The user operates the portable terminal 50 to thus select the MFP 10 from the device list (YES in S54 of FIG. 3). In this case, the portable terminal 50 requests a connection request (S56). In the meantime, the portable terminal 50 repeatedly transmits the connection request until an OK response is received or until a state where an OK response is not received continues for a predetermined time period.

The user applies a PBC connection operation to the operation unit 12 of the MFP 10 at the G/O state (YES in S10 of FIG. 2). In this case, the MFP 10 shifts to the standby state of the connection request (S12). Therefore, the MFP 10 receives a connection request from the portable terminal 50 and transmits an OK response to the portable terminal 50 (S14).

Then, the MFP 10 determines that the number of the CL devices belonging to the WFDNW (MFP=G/O) is smaller than the upper limit (NO in S16). Thus, the MFP 10 performs WPS communication and transmits the M8 packet including the WFDWSI of the WFDNW (MFP=G/O) to the portable terminal 50 (S20 of FIG. 2, S58 of FIG. 3).

Subsequently, the MFP 10 and the portable terminal 50 perform authentication communication (S20 of FIG. 2, S60 of FIG. 3). Since the authentication succeeds (YES in S62 of FIG. 3), the connection is established between the MFP 10 at the G/O state and the portable terminal 50. As a result, the portable terminal 50 participates in the WFDNW (MFP=G/O), as the CL device. Therefore, the MFP 10 at the G/O state can receive the print data from the portable terminal 50 at the CL state by using the WFDNW (MFP=G/O), without going through the other device (S40 of FIG. 2, S64 of FIG. 3).

(FIG. 5; Case B)

At an initial state of the case B in FIG. 5, the WFDNW (MFP=G/O) is established in which the MFP 10 is a G/O device. A plurality of PCs 100 (refer to FIG. 1) belongs to the WFDNW (MFP=G/O), so that the number of the CL devices belonging to the WFDNW (MFP=G/O) is to be the same as the upper limit. Also, the MFP 10 belongs to the Infra NW.

The operations that are performed until a connection request is transmitted from the portable terminal 50 to the MFP 10 are the same as the case A of FIG. 4. In a state where the MFP 10 belongs to both the WFDNW (MFP=G/O) and the Infra NW, the MFP 10 receives a connection request from the portable terminal 50 and transmits an OK response to the portable terminal 50 (S14). The MFP 10 determines that the number of the CL devices belonging to the WFDNW (MFP=G/O) is the same as the upper limit (YES in S16) and determines that the MFP 10 belongs to the Infra NW ('infra' in S30). Thus, the MFP 10 performs WPS communication and transmits the M8 packet including the WSI of the Infra and the error message to the portable terminal 50 (S32 of FIG. 2, S58 of FIG. 3).

The portable terminal 50 displays the error message (the error message indicating that the portable terminal 50) is connected to an AP) included in the M8 packet (S58 in FIG. 3). Thereby, the user can know that the portable terminal 50 cannot be connected to the MFP 10 in accordance with the WFD mode and can be instead connected to the AP 4. The portable terminal 50 performs authentication communication with the AP 4 (S60 of FIG. 3).

Since the authentication succeeds (YES in S62 of FIG. 3), the connection is established between the portable terminal 50 and the AP 4. As a result, the portable terminal 50 participates in the Infra NW. Therefore, the MFP 10 can receive the print data from the portable terminal 50 by using the Infra NW without going through the AP 4 while maintaining the WFDNW (MFP=G/O) (S40 of FIG. 2, S64 of FIG. 3). Since the MFP 10 maintains the WFDNW (MFP=G/O), the MFP can receive the print data from the CL device (for example, the PC 100) belonging to the WFDNW (MFP=G/O).

(FIG. 6; Case C)

At an initial state of the case C in FIG. 6, the WFDNW (MFP=G/O) is established in which the MFP 10 is a G/O device. The number of the CL devices belonging to the WFDNW (MFP=G/O) is the same as the upper limit. Also, the MFP 10 does not belong to the normal Wi-FiNW.

The operations that are performed until a connection request is transmitted from the portable terminal 50 to the MFP 10 are the same as the case A of FIG. 4. In a state where the MFP 10 belongs to only the WFDNW (MFP=G/O), the MFP 10 receives a connection request from the portable terminal 50 and transmits an OK response to the portable terminal 50 (S14 of FIG. 2). The MFP 10 determines that the number of the CL devices belonging to the WFDNW (MFP=G/O) is the same as the upper limit (YES in S16) and determines that the MFP 10 does not belong to the normal Wi-FiNW ('NO' in S30). Thus, the MFP 10 performs WPS communication and transmits the M8 packet including the WSI of the ad hoc and the error message to the portable terminal 50 (S34 of FIG. 2, S58 of FIG. 3).

The portable terminal 50 displays the error message (the error message indicating that the portable terminal 50 is connected with the ad hoc) included in the M8 packet (S58 in FIG. 3). Thereby, the user can know that the portable terminal 50 cannot be connected to the MFP 10 in accordance with the WFD mode and can be instead connected to the MFP 10 with the ad hoc.

Then, the MFP 10 and the portable terminal 50 perform authentication communication (S34 of FIG. 2, S60 of FIG. 3). Since the authentication succeeds (YES in S62 of FIG. 3), the connection is established between the MFP 10 and the portable terminal 50. As a result, the MFP 10 and the portable terminal 50 establish the ad hoc NW. Therefore, the MFP 10 can receive the print data from the portable terminal 50 by using the ad hoc NW without going through the other device while maintaining the WFDNW (MFP=G/O) (S40 of FIG. 2, S64 of FIG. 3).

Effects of Illustrative Embodiment

As shown in the cases A to C of FIGS. 4 to 6, at the state where the MFP 10 belongs to the WFDNW (MFP=G/O) as a G/O device, the MFP receives the connection request from the portable terminal 50. As shown in the case A of FIG. 4, when it is determined that the number of the CL devices belonging to the WFDNW (MFP=G/O) is smaller than the upper limit, the MFP 10 transmits the WFDWSI of the WFDNW (MFP=G/O) to the portable terminal 50. Thereby, since the portable terminal 50 participates in the WFDNW (MFP=G/O) as a CL device, the MFP 10 can receive the print data from the portable terminal 50 by using the WFDNW (MFP=G/O), without going through the other apparatus.

Also, as shown in the case B of FIG. 5, at the state where the MFP 10 belongs to the Infra NW, when the MFP 10 determines that the number of the CL devices belonging to the WFDNW (MFP=G/O) is the same as the upper limit, the MFP 10 transmits the WSI of the Infra to the portable terminal 50. Thereby, since the portable terminal 50 participates in the Infra NW, the MFP 10 can receive the print data from the portable terminal 50 by using the Infra NW, through the AP 4.

Also, as shown in the case C of FIG. 6, at the state where the MFP 10 does not belong to the normal Wi-FiNW, when the MFP 10 determines that the number of the CL devices belonging to the WFDNW (MFP=G/O) is the same as the upper limit, the MFP 10 transmits the WSI of the ad hoc to the portable terminal 50. Thereby, since the MFP 10 and the portable terminal 50 establish the ad hoc NW, the MFP 10 can receive the print data from the portable terminal 50 by using the ad hoc NW, without going through the other apparatus.

Like this, the MFP 10 can execute the appropriate processing, depending on whether the number of the CL devices belonging to the WFDNW (MFP=G/O) is the same as or smaller than the upper limit. As a result, the MFP 10 can appropriately receive the print data from the portable terminal 50.

(Correspondence Relation)

The MFP 10 and the portable terminal 50 are examples of the 'communication apparatus' and the target device', respectively. The wireless LAN I/F is an example of the 'specific interface'. The 'G/O device' and the 'CL device' are examples of the master station' and the 'slave station', respectively. The connection request and the print data are examples of the 'participation request' and the 'target data', respectively. The WFD mode and the normal Wi-Fi mode are examples of the 'first wireless communication method' and the 'second wireless communication method', respectively. The G/O negotiation is an example of the 'structure of performing wireless communication for determining the master station and the slave station'. The PBC method and the PBC connection operation are examples of the 'specific wireless connection method' and the 'specific operation', respectively. The M8 packet, the ES area and the VE area are examples of the 'specific packet', the 'first attribute area' and the 'second attribute area', respectively.

The case A of FIG. 4 and the case B of FIG. 5 (or case C of FIG. 6) are examples of the 'first case' and the 'second case', respectively. The WFDNW (MFP=G/O) and the WFDWSI are examples of the 'first wireless network' and the 'first wireless setting information', respectively. In the case B of FIG. 5, the Infra NW and the WSI of the Infra are examples of the 'second wireless network' and the 'second wireless setting information', respectively. In the case C of FIG. 6, the ad hoc NW and the WSI of the ad hoc are examples of the 'second wireless network' and the 'second wireless setting information', respectively.

Second Illustrative Embodiment

In this illustrative embodiment, the contents of the processing of S32 and S34 of FIG. 2 are different from those of the first illustrative embodiment. As shown in FIG. 7, in the first illustrative embodiment, the second transmission unit 43 sets the WSI of the Infra and the error message in the VE area in S32 and sets the WSI of the ad hoc and the error message in the VE area in S34. Compared to this, in S32 of this illustrative embodiment, the second transmission unit 43 sets the WSI of the Infra in the ES area without setting the WSI of the Infra and the error message in the VE area. Also, in S34 of this illustrative embodiment, the second transmission unit 43 sets the WSI of the ad hoc in the ES area without setting the WSI of the ad hoc and the error message in the VE area.

In S58 of FIG. 3, even when the portable terminal 50 receives the M8 packet including the ES area having the WSI of the Infra or ad hoc set therein, it does not display the error message, unlike the first illustrative embodiment. Then, in S60, the portable terminal 50 performs authentication communication with the AP 4 or MFP 10 by using the WSI of the Infra or ad hoc set in the ES area.

A device (hereinafter, referred to as 'WPS support device'; for example, the MFP 10, the portable terminal 50) that supports the WPS has a program for setting the wireless setting information in the ES area of the M8 packet or reading out the wireless setting information from the ES area to thereby establish the connection. However, in order to describe information in the VE area of the M8 packet, the WPS support device should have a special program (hereinafter, referred to as 'recording-side program') for the description. Also, in order to read out information from the VE area of the M8 packet and to execute processing relating to the information, the WPS support device should have a special program (hereinafter, referred to as 'readout-side program') for the same. As described above, in the first illustrative embodiment, since the MFP 10 sets the WSI of the Infra or ad hoc and the error message in the VE area of the M8 packet (S32, S34 in FIG. 2), it should have the recording-side program. Also, since the portable terminal 50 reads out the WSI of the Infra or ad hoc and the error message set in the VE area of the M8 packet and executes the processing relating to the information (S58 in FIG. 3), it should have the readout-side program.

Compared to the above, in this illustrative embodiment, the wireless setting information and the error message are not set in the VE areas of all the M8 packets (S20, S32 to S36 in FIG. 2) that are transmitted from the MFP 10 to the portable terminal 50. Therefore, the MFP 10 does not have to describe the information in the VE area of the M8 packet. Thus, the MFP 10 may not have the recording-side program and can easily execute the processing. Also, the portable terminal 50 does not have to read out the information from the VE area of the M8 packet and to execute the processing relating to the information. Therefore, the portable terminal 50 (i.e., the application for MFP) may not have the readout-side program. Thus, the vendor of the MFP 10 can prepare the application for MFP relatively easily.

Although the specific illustrative embodiments of the invention have been specifically set, they are just exemplary and do not limit the claims. The technology defined in the claims includes a variety of modifications and changes to the above illustrative embodiments. In the following, modified embodiments of the above illustrative embodiments are enumerated.

Modified Embodiment 1

The processing of S34 in FIG. 2 may be omitted. That is, (1) when the MFP 10 belongs to the Infra NW, the second transmission unit 43 may execute the processing of S32 and (2) when the MFP 10 does not belong to the Infra NW, the second transmission unit 43 may execute the processing of S36, irrespective of whether the MFP 10 belongs to the ad hoc NW. Also, the processing of S32 may be omitted. That is, (1) when the MFP 10 does not belong to the normal Wi-FiNW, the second transmission unit 43 may execute the processing of S34, and (2) when the MFP 10 belongs to the Infra or ad hoc NW, the second transmission unit 43 may execute the processing of S36.

Modified Embodiment 2

In S34 of FIG. 2, the second transmission unit 43 may newly establish the Infra NW in accordance with the so-called SoftAP method, instead of newly establishing the ad hoc NW. That is, in S34, the second transmission unit 43 operates the MFP 10 with the SoftAP method. Thereby, the Infra NW in which the MFP 10 functions as an AP is newly established. Then, the second transmission unit 43 prepares the WSI of the Infra and transmits the WSI of the Infra to the portable terminal 50. After that, the MFP 10 and the portable terminal 50 perform authentication communication, based on the WSI of the infra. Thereby, the portable terminal 50 newly participates in the Infra NW in which the MFP 10 functions as an AP. As a result, the MFP 10 can receive the print data from the portable terminal 50 by using the infra NW, without going through the other apparatus. In this modified embodiment, the infra NW and the WSI of the Infra based on the SoftAP method are examples of the 'second wireless network' and the 'second wireless setting information', respectively.

Modified Embodiment 3

In S32 or S34 of FIG. 2, the second transmission unit 43 may describe the WSI of the Infra or the WSI of the ad hoc in the ES area and the error message in the VE area when generating the M8 packet. Also in this configuration, the second transmission unit 43 can appropriately transmit the WSI of the Infra or the WSI of the ad hoc to the portable terminal 50.

Modified Embodiment 4

In S20 of FIG. 2, the first transmission unit 42 may not transmit all the information (i.e., the authentication method, the encryption method, the SSID, the BSSID and the password) included in the WFDWSI to the portable terminal 50 or may transmit only a part of the information (for example, the SSID, the BSSID and the password) to the portable terminal 50. In this case, the portable terminal 50 performs authentication communication with the MFP 10 in accordance with the part of the information and may acquire the other information (for example, the authentication method and the encryption method) from the MFP 10 during the authentication communication. Also, the portable terminal 50 may perform authentication communication with the MFP 10 by sequentially using a plurality of combinations of the authentication method and the encryption method, which are supported by the portable terminal 50, thereby specifying the authentication method and the encryption method that are currently used by the MFP 10. Also in this configuration, the portable terminal 50 can participate in the WFDNW (MFP=G/O). Likewise, in S32 or S34 of FIG. 2, the second transmission unit 43 may not transmit all the information included in the WSI of the Infra or ad hoc to the portable terminal 50 and may transmit only a part of the information to the portable terminal 50. In this modified embodiment, the part of the information is an example of the 'first wireless setting information' and the 'second wireless setting information'.

Modified Embodiment 5

The MFP 10 may support not only the PBC method of the WPS but also the PIN code method of the WPS. In the PIN code method, when a PIN code is displayed on one device and the PIN code is input to the other device, the one device and the other device perform WPS communication by using the PIN code. For example, the user of the portable terminal 50 may select an item indicating the 'PIN code method', which is included in the screen displayed on the display unit 14 of the MFP 10, and then select an item indicating the 'display of the PIN code'. When the PIN code display operation is applied to the operation unit 12, the control unit 30 determines YES in S10 of FIG. 2, displays the predetermined PIN code on the display unit 14 and then proceeds to S12. In this case, when the PIN code displayed on the MFP 10 is input to the portable terminal 50 by the user, the portable terminal 50 transmits a connection request. In this modified embodiment, the 'PIN code method' and the 'PIN code display operation' are examples of the 'specific wireless connection method' and the 'specific operation', respectively.

Modified Embodiment 6

In the above illustrative embodiment, three or more devices cannot belong to the ad hoc NW. Instead of this, however, three or more devices can belong to the ad hoc NW. In this modified embodiment, when it is determined in S30 of FIG. 2 that the MFP 10 belongs to the ad hoc NW, the second transmission unit 43 may transmit the WSI of the ad hoc, which is currently used in the existing ad hoc NW, to the portable terminal 50, instead of executing the processing of S36. According to this configuration, the portable terminal 50 can newly participate in the existing ad hoc NW. In this modified embodiment, the existing ad hoc NW and the WSI of the ad hoc are examples of the 'second wireless network' and the 'second wireless setting information', respectively.

Modified Embodiment 7

In the above illustrative embodiment, when the PBC connection operation is made in S10, the determination unit 45 executes the determination of S16 in FIG. 2 after the connection request is received in S14. Instead of this, when the PBC connection operation is made in S10, the determination unit 45 may execute the determination of S16 in FIG. 2 before the connection request is received in S14. That is, when the PBC connection operation is made in S10, the determination unit 45 may have only to execute the determination of S16 in FIG. 2.

Modified Embodiment 8

The 'target data' may be scan data, other than the print data. In this modified embodiment, for example, the communication execution unit 44 enables the scan execution unit 18 to execute the scanning and transmits the scan data to the portable terminal 50, instead of S40 and S42 of FIG. 2. In the meantime, the 'target data' may be data (for example, voice data, moving picture data and the like) different from the print data and the scan data.

Modified Embodiment 9

The 'master station' is not limited to the G/O device of the WFD mode and may be any device insomuch as it is a device (for example, a device capable of relaying wireless communication between respective devices belonging to the wireless network) managing respective devices belonging to the wireless network. Also, the 'slave station' is not limited to the CL, device of the WFD mode and may be any device as long as it is managed with the master station of the wireless network.

Modified Embodiment 10

The 'communication apparatus' is not limited to the MFP 10 and may be other communication apparatus (for example, a printer, a scanner, a FAX apparatus, a copier, a phone, a desktop PC, a notebook PC, a tablet PC, a server, a portable phone, a PDA terminal and the like). Also, the 'target device' is not limited to the portable terminal 50 and may be other communication apparatus (for example, an MFP, a printer, a scanner, a FAX apparatus, a copier, a phone, a desktop PC and the like).

Modified Embodiment 11

In the above illustrative embodiment, the CPU 32 of the MFP 10 executes the programs (i.e., software) in the memory 34, thereby functioning as the respective units 41 to 45. Instead of this, at least one of the respective units 41 to 45 may be implemented by hardware such as a logical circuit and the like.

Also, the technical elements illustrated in the specification or drawings exhibit the technical availability individually or by a variety of combinations thereof and are not limited to the combinations defined in the claims at the time of filing the application. Also, the technology exemplified in the specification or drawings achieves a plurality of purposes at the same and the achievement of any one purpose has the technical availability.

What is claimed is:

1. A communication apparatus comprising:
a specific interface;
a processor; and
a memory storing instructions that, when executed by the processor, causes the processor to execute:
receiving a participation request from a target device through the specific interface, in a state where a first wireless network to which the communication apparatus belongs as a master station has been established, for requesting participation in the first wireless network, the target device not belonging to the first wireless network;

determining whether the number of slave station apparatuses belonging to the first wireless network as a slave station is the same as a predetermined upper limit or smaller than the predetermined upper limit;

transmitting first wireless setting information to the target device through the specific interface, in a first case where the participation request is received and then it is determined that the number of the slave station apparatuses is smaller than the upper limit, the first wireless setting information being currently used in the first wireless network;

transmitting second wireless setting information to the target device through the specific interface, in a second case where the participation request is received and then it is determined that the number of the slave station apparatuses is the same as the upper limit, the second wireless setting information being used in a second wireless network different from the first wireless network, wherein the communication apparatus establishes communication with the second wireless network and then belongs to the second wireless network as well as the first wireless network;

performing a communication of target data, in the first case, with the target device through the specific interface by using the first wireless network to which both the communication apparatus and the target device belong, after the first wireless setting information is transmitted to the target device; and performing a communication of the target data, in the second case, with the target device through the specific interface by using the second wireless network to which both the communication apparatus and the target device belong, after the second wireless setting information is transmitted to the target device.

2. The communication apparatus according to claim 1,
wherein the first wireless network is a wireless network based on a first wireless communication method, and
wherein the second wireless network is a wireless network based on a second wireless communication method different from the first wireless communication method.

3. The communication apparatus according to claim 2,
wherein the first wireless communication method is a method having a system of performing wireless communication, in which a pair of devices determines a master station and a slave station of the wireless network when connection between the pair of devices is established based on the first wireless communication method to establish the wireless network, and
wherein the second wireless communication method does not have the system.

4. The communication apparatus according to claim 1,
wherein in case of the second case, the instructions further cause the processor to execute performing communication of the target data with the target device by using the second wireless network in a state where the communication apparatus belongs to both the first wireless network and the second wireless network.

5. The communication apparatus according to claim 1,
wherein the second wireless network is a wireless network functioning as infrastructure mode comprising an access point different from both the communication apparatus and the target device,
wherein the instructions further cause the processor to execute receiving the participation request in a state where the communication apparatus belongs to both the first wireless network and the second wireless network, wherein in the second case, the instructions further cause the processor to execute transmitting the second wireless setting information, which is prepared by the access point and is currently used in the second wireless network, to the target device, and
wherein the instructions further cause the processor to execute:
performing communication of the target data with the target device by using the first wireless network, without going through the access point, in the first case; and
performing communication of the target data with the target device by using the second wireless network, through the access point, in the second case.

6. The communication apparatus according to claim 1,
wherein the second wireless network is a wireless network functioning as an ad hoc mode,
wherein the instructions further cause the processor to execute receiving the participation request in a state where the communication apparatus belongs to the first wireless network but does not belong to the second wireless network,
wherein in the second case, the instructions further cause the processor to execute transmitting the second wireless setting information, which is prepared by the communication apparatus and is used for newly establishing the second wireless network to which the communication apparatus and the target device belong, to the target device, and
wherein the instructions further cause the processor to execute:
performing communication of the target data with the target device by using the first wireless network, without going through another apparatus, in the first case; and
performing communication of the target data with the target device by using the second wireless network, without going through another apparatus, in the second case.

7. The communication apparatus according to claim 1,
wherein the instructions further cause the processor to execute determining when a specific operation based on a specific wireless connection method is input to the communication apparatus, and
wherein the specific wireless connection method is a method for establishing connection between a pair of devices when a predetermined operation is executed in each of the pair of devices even though a PIN code is not input by a user.

8. The communication apparatus according to claim 1,
wherein in the first case, the instructions further cause the processor to execute setting the first wireless setting information in a first attribute area in a specific packet and then transmitting the specific packet to the target device to thereby transmit the first wireless setting information to the target device, and
wherein in the second case, the instructions further cause the processor to execute setting message information, which indicates that it is not possible to participate in the first wireless network, and the second wireless setting information in a second attribute area in the specific packet different from the first attribute area and then transmitting the specific packet to the target device to thereby transmit the second wireless setting information to the target device.

9. The communication apparatus according to claim 1,
wherein in the first case, the instructions further cause the processor to execute setting the first wireless setting information in a first attribute area in a specific packet and then transmitting the specific packet to the target device to thereby transmit the first wireless setting information to the target device, and wherein in the second case, the instructions further cause the processor to execute setting the second wireless setting information in the first attribute area in the specific packet and then transmitting the specific packet to the target device to thereby transmit the second wireless setting information to the target device.

10. The communication apparatus according to claim 1, wherein instructions further cause the processor to execute transmitting the first wireless setting information to the target device without using a network layer or higher layer than the network layer of an OSI reference model, wherein instructions further cause the processor to execute transmitting the second wireless setting information to the target device without using the network layer or higher layer than the network layer of the OSI reference model, and wherein instructions further cause the processor to execute performing communication of the target data with the target device by using the network layer or higher layer than the network layer of the OSI reference model.

11. A non-transitory computer-readable medium having instructions to control a communication apparatus having a specific interface to perform operations comprising:

receiving a participation request from a target device through the specific interface, in a state where a first wireless network to which the communication apparatus belongs as a master station has been established, for requesting participation in the first wireless network, the target device not belonging to the first wireless network;

determining whether the number of slave station apparatuses belonging to the first wireless network as a slave station is the same as a predetermined upper limit or smaller than the predetermined upper limit;

transmitting first wireless setting information to the target device through the specific interface, in a first case where the participation request is received and then it is determined that the number of the slave station apparatuses is smaller than the upper limit, the first wireless setting information being currently used in the first wireless network;

transmitting second wireless setting information to the target device through the specific interface, in a second case where the participation request is received and then it is determined that the number of the slave station apparatuses is the same as the upper limit, the second wireless setting information being used in a second wireless network different from the first wireless network, wherein the communication apparatus establishes communication with the second wireless network and then belongs to the second wireless network as well as the first wireless network;

performing a communication of target data, in the first case, with the target device through the specific interface by using the first wireless network to which both the communication apparatus and the target device belong, after the first wireless setting information is transmitted to the target device; and performing a communication of the target data, in the second case, with the target device through the specific interface by using the second wireless network to which both the communication apparatus and the target device belong, after the second wireless setting information is transmitted to the target device.

\* \* \* \* \*